(12) United States Patent
Hakari et al.

(10) Patent No.: US 8,252,239 B2
(45) Date of Patent: Aug. 28, 2012

(54) LIQUID-LIQUID EXTRACTION SYSTEM (75) Inventors: Mami Hakari, Ushiku (JP); Shigenori Togashi, Abiko (JP); Yasuhiko Sasaki, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 12/783,924

(22) Filed: May 20, 2010

(65) Prior Publication Data
US 2010/0296976 A1 Nov. 25, 2010

(30) Foreign Application Priority Data

May 22, 2009 (JP) ................. 2009-123683

(51) Int. Cl.
B06B 1/20 (2006.01)
B01D 11/00 (2006.01)
B01D 17/02 (2006.01)
(52) U.S. Cl. ........................ 422/128; 422/127
(58) Field of Classification Search .................. 422/127, 422/128
See application file for complete search history.

(56) References Cited

U.S. PATENT DOCUMENTS

| 2003/0183043 A1 | 10/2003 | Wai et al. |
| 2006/0158956 A1 | 7/2006 | Laugharn |
| 2007/0007204 A1 | 1/2007 | Schanz |

FOREIGN PATENT DOCUMENTS

| DE | 103 33 921 | | 2/2005 |
| EP | 0 583 200 | | 2/1994 |
| EP | 2 033 706 | A2 | 3/2009 |
| EP | 2 123 349 | A2 | 11/2009 |
| JP | 04-293537 | | 10/1992 |
| JP | 08-010509 | | 1/1996 |
| JP | 2007-136271 | | 6/2007 |
| JP | 2007-516067 | | 6/2007 |
| JP | 2009-061382 | | 3/2009 |
| JP | 2009-279507 | | 12/2009 |
| WO | WO 2004/103539 | A2 | 12/2004 |

*Primary Examiner* — Sean E Conley
(74) *Attorney, Agent, or Firm* — Antonelli, Terry, Stout & Kraus, LLP.

(57) ABSTRACT

The invention aims to reduce the processing time of liquid-liquid extraction, reduce variations in the amount of extraction of a solute, and improve the extraction efficiency. Provided are a container adapted to contain a continuous phase and a dispersion phase that are mutually immiscible liquids, and a solute dissolved in at least one of the continuous and dispersion phases, a water tank accommodating therein the container and containing water around the container, an emulsification ultrasonic oscillation source disposed outside the water tank, on a plane substantially parallel with the interface between the continuous and dispersion phases, a separation ultrasonic oscillation source disposed outside the water tank, an ultrasonic-oscillation-source driving circuit configured to drive the emulsification ultrasonic oscillation source and the separation ultrasonic oscillation source, and a control unit configured to control the ultrasonic-oscillation-source driving circuit such that it sequentially drives the emulsification ultrasonic oscillation source and the separation ultrasonic oscillation source.

7 Claims, 7 Drawing Sheets

LIQUID-LIQUID EXTRACTION SYSTEM

BACKGROUND OF THE INVENTION

1. Field of the Invention

The present invention relates to a liquid-liquid extraction system for separation and purification of a solute.

2. Background Art

Liquid-liquid extraction is a method of separating and purifying a solute, with which a solute dissolved in one of a continuous phase and a dispersion phase that are mutually immiscible liquids is caused to migrate to the other phase. The liquid-liquid extraction involves, for the purpose of increasing the interfacial area between the continuous phase and the dispersion phase and thus improving the extraction efficiency, the three following steps: emulsification to produce droplets of the dispersion phase in the continuous phase, extraction to cause a solute dissolved in one of the two phases to migrate to the other phase, and separation to aggregate the droplets and separate the two phases of the continuous phase and the dispersion phase. In the currently used method (hereinafter referred to as a batch method), such three steps are performed using a separatory funnel. In the emulsification, liquids are shaken by hand, and in the extraction and separation, the emulsion is allowed to stand still.

Meanwhile, there is also known an emulsification/separation technique using ultrasonic irradiation, which is used for liquid-liquid extraction.

Liquid-liquid extraction using ultrasonic irradiation involves the use of two ultrasonic oscillation sources with different oscillation frequencies for use in emulsification and separation (hereinafter also referred to as an emulsification ultrasonic oscillation source and a separation ultrasonic oscillation source, respectively), two water tanks, below which the two ultrasonic oscillation sources are disposed, respectively, and a container adapted to contain a solution.

In the emulsification using ultrasonic irradiation, droplets of the dispersion phase, which have been produced by irradiating the continuous phase and the dispersion phase in the container with ultrasonic waves, are reduced in size by means of cavitation bubbles that have also been produced by the ultrasonic irradiation (for example, see Reference 1: JP Published Patent Application No. 04-293537 A (1992)).

Meanwhile, in the separation using ultrasonic irradiation, an aggregate of droplets, which have been produced on the nodes and antinodes of ultrasonic waves by irradiating the emulsion with ultrasonic waves, are separated into the two phases of the continuous phase and the dispersion phase by the difference in specific gravity upon termination of the ultrasonic irradiation (for example, see Reference 2: JP Published Patent Application No. 08-010509 A (1996) and Reference 3: JP Published Patent Application No. 2007-136271 A).

SUMMARY OF THE INVENTION

The batch method, however, has a problem in that it requires a long processing time as the emulsification is performed by manually shaking liquids with a small shaking force and the separation is performed by allowing the emulsion to stand still for a while. There is also another problem in that, as the emulsification is performed by manually shaking liquids, the reproducibility of shaking in each operation is low, which could result in large variations in the amount of extract. Further, there is still another problem in that as the emulsification is performed with a small shaking force, the diameter of the produced droplets is small and thus the extraction efficiency is low.

Meanwhile, liquid-liquid extraction using ultrasonic irradiation involves the use of two ultrasonic oscillation sources with different oscillation frequencies for use in emulsification and in separation, two water tanks, below which the two ultrasonic oscillation sources are disposed, respectively, and a container containing a solution. Thus, as the container needs to be moved between the water tanks, there is a problem in that continuous processing cannot be performed. There is also another problem in that such movement of the container would take a long time. Further, there is still another problem in that the size of the water tanks could be increased.

Further, in the liquid-liquid extraction using ultrasonic irradiation, in order to perform continuous processing, reduce the processing time, and reduce the size of the system, it would be necessary to dispose both the emulsification ultrasonic oscillation source and the separation ultrasonic oscillation source on a single water tank. In Reference 2, such ultrasonic oscillation sources are disposed below the water tank. However, if the two ultrasonic oscillation sources are disposed one on top of the other or disposed horizontally below a single water tank, it would be difficult for the performance of the two ultrasonic oscillation sources to be maintained. Therefore, when an emulsification ultrasonic oscillation source and a separation ultrasonic oscillation source are disposed below a single water tank, it is desired that the performance of both the emulsification and separation should not be degraded.

The present invention has been made in view of the foregoing problems. It is an object of the present invention to reduce the processing time of liquid-liquid extraction, reduce variations in the amount of extraction of a solute, and improve the extraction efficiency.

According to one aspect of the present invention, in order to achieve the aforementioned object, there is provided a system that includes: a container adapted to contain a continuous phase and a dispersion phase that are mutually immiscible liquids, and a solute dissolved in at least one of the continuous phase and the dispersion phase, a water tank accommodating therein the container and containing water around the container, an emulsification ultrasonic oscillation source disposed outside the water tank, on a plane substantially parallel with the interface between the continuous phase and the dispersion phase, a separation ultrasonic oscillation source disposed outside the water tank, an ultrasonic-oscillation-source driving circuit configured to drive the emulsification ultrasonic oscillation source and the separation ultrasonic oscillation source, and a control unit configured to control the ultrasonic-oscillation-source driving circuit such that the ultrasonic-oscillation-source driving circuit sequentially drives the emulsification ultrasonic oscillation source and the separation ultrasonic oscillation source.

Further, the separation ultrasonic oscillation source is disposed on a plane substantially perpendicular to the interface between the continuous phase and the dispersion phase.

The system further includes a movement mechanism configured to move the water tank in a direction substantially parallel with the interface between the continuous phase and the dispersion phase. The separation ultrasonic oscillation source is disposed on the plane substantially parallel with the interface between the continuous phase and the dispersion phase.

Further, a wall of the container is disposed substantially parallel with or substantially perpendicular to the emulsification ultrasonic oscillation source, and the thickness of the wall of the container is an integral multiple of half the wavelength of ultrasonic waves that are oscillated by the emulsification ultrasonic oscillation source or the separation ultrasonic oscillation source.

The thickness of the wall of the water tank is an integral multiple of half the wavelength of ultrasonic waves that are oscillated by the emulsification ultrasonic oscillation source or the separation ultrasonic oscillation source.

According to another aspect of the present invention, there is provided a liquid-liquid extraction system with which liquid-liquid extraction is performed by causing a solute dissolved in one of a continuous phase and a dispersion phase that are mutually immiscible liquids to migrate to the other phase. Specifically, the system includes a microreactor with micro flow channels therein, the microreactor being adapted to produce droplets of the dispersion phase in the continuous phase to emulsify the two phases, a container adapted to contain the continuous phase, the dispersion phase, and the solute transferred from the microreactor, a water tank accommodating therein the container and containing water around the container, a separation ultrasonic oscillation source disposed outside the water tank, and a control unit configured to cause the separation ultrasonic oscillation source to operate after the emulsification.

The system further includes an emulsification ultrasonic oscillation source disposed outside the water tank, on a plane substantially parallel with the interface between the continuous phase and the dispersion phase. The control unit sequentially drives the emulsification ultrasonic oscillation source and the separation ultrasonic oscillation source.

According to the present invention, the processing time of the batch method is reduced and variations in the amount of extraction of a solute are reduced, whereby the extraction efficiency can be improved.

DESCRIPTION OF SYMBOLS

101 Continuous Phase
102 Dispersion Phase
103 Solute
104, 205 Container
105 Water
106, 206 Water Tank
107 Emulsification Ultrasonic Oscillation Source
108 Separation Ultrasonic Oscillation Source
109 Ultrasonic-Oscillation-Source Driving Circuit
110, 208, 404, 503 Control Unit
111 Movement Mechanism
201 Syringe
202 Syringe Pump
203 Emulsion
204 Microreactor
207 Driving Circuit
401, 502 Liquid-Liquid Extraction Unit
402 Solid-Phase Extraction Unit
403 LC/MS Unit
405 Recovery Syringe
406 Solid-Phase Extraction Column
407 Three-Way Valve
408 Liquid Chromatography Column
409 Detection Unit
501 Microreactor Unit
504 Temperature Control Unit

DETAILED DESCRIPTION OF THE PREFERRED EMBODIMENTS

Hereinafter, embodiments will be described with reference to the accompanying drawings.

First, Embodiment 1 will be described with reference to FIGS. 1 to 4. In Embodiment 1, a continuous phase and a dispersion phase are emulsified with an emulsification technique using ultrasound waves, and the dispersion phase is separated with a separation technique using ultrasonic waves.

Figure 1:
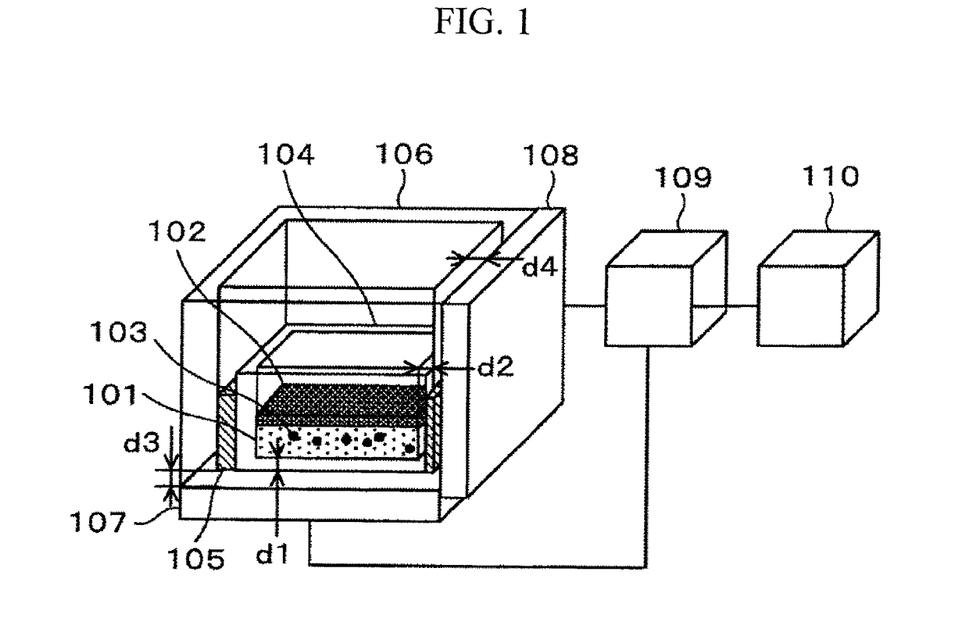
FIG. 1 is a diagram showing a liquid-liquid extraction system in accordance with Embodiment 1.

FIG. 1 is a diagram showing Embodiment 1. As shown in FIG. 1, the system of Embodiment 1 includes a continuous phase 101 and a dispersion phase 102 that are mutually immiscible liquids; a solute 103 dissolved in at least one of the continuous phase 101 and the dispersion phase 102; a container 104 containing the continuous phase 101, the dispersion phase 102, and the solute 103; a water tank 106 accommodating therein the container 104 and containing water 105 around the container 104; an emulsification ultrasonic oscillation source 107 adapted to emulsify the continuous phase 101 and the disperse phase 102; a separation ultrasonic oscillation source 108 adapted to separate the continuous phase 101 and the dispersion phase 102 following the steps of emulsification and extraction of the solute 103; an ultrasonic-oscillation-source driving circuit 109 that drives the emulsification ultrasonic oscillation source 107 and the separation ultrasonic oscillation source 108; and a control unit 110 that operates the ultrasonic-oscillation-source driving circuit 109.

Figure 2:
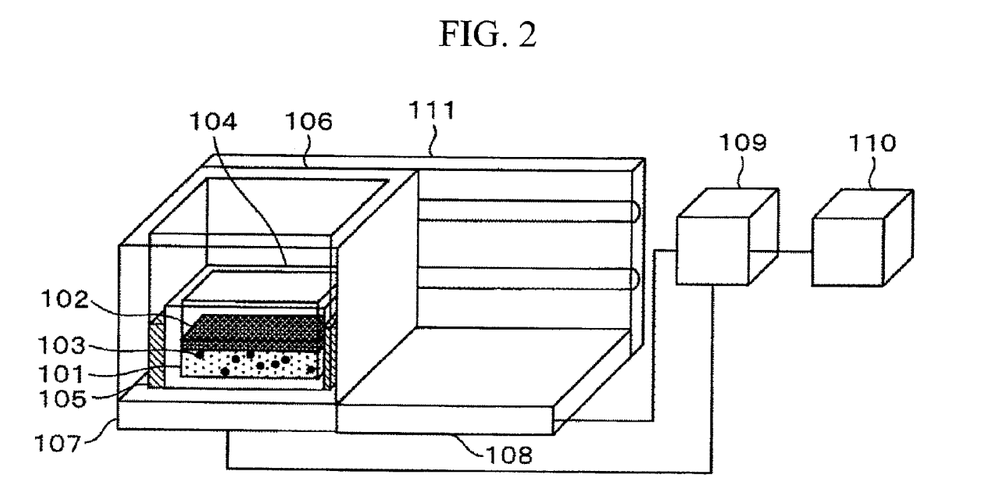
FIG. 2 is a diagram showing a liquid-liquid extraction system in accordance with Embodiment 1 in which an emulsification ultrasonic oscillation source and a separation ultrasonic oscillation source are disposed on a plane substantially parallel with the interface between a continuous phase and a dispersion phase.

Hereinafter, each element of Embodiment 1 shown in FIGS. 1 and 2 will be detailed.

The continuous phase 101 and the dispersion phase 102 are mutually immiscible liquids. The solute 103 is dissolved in one of the continuous phase 101 and the dispersion phase 102, and will migrate to the other phase through liquid-liquid extraction.

The container 104 is disposed such that its walls are substantially parallel with or substantially perpendicular to the interface between the continuous phase 101 and the dispersion phase 102. The thicknesses d1 and d2 of the walls of the container 104 that are opposite the emulsification ultrasonic oscillation source 107 and the separation ultrasonic oscillation source 108, respectively, are designed to be at least an integral multiple of half the wavelength of ultrasonic waves that are oscillated by the emulsification ultrasonic oscillation source 107 or the separation ultrasonic oscillation source 108 in order to minimize the attenuation of the ultrasonic waves.

Material of the water tank 106 is desirably selected such that the difference in impedance between the water tank 106 and the emulsification ultrasonic oscillation source 107 and between the water tank 106 and the separation ultrasonic oscillation source 108 is small in order to minimize the attenuation of the ultrasonic waves due to reflection at the interface between the water tank 106 and the emulsification ultrasonic oscillation source 107 or the separation ultrasonic oscillation source 108. The thicknesses d3 and d4 of the walls of the water tank 106 that are opposite the emulsification ultrasonic oscillation source 107 and the separation ultrasonic oscillation source 108, respectively are designed to be at least an integral multiple of half the wavelength of ultrasonic waves that are oscillated by the emulsification ultrasonic oscillation source 107 or the separation ultrasonic oscillation source 108 in order to minimize the attenuation of the ultrasonic waves.

The emulsification ultrasonic oscillation source 107 oscillates ultrasonic waves for emulsification (hereinafter referred to as emulsification ultrasonic waves) to emulsify the continuous phase 101 and the dispersion phase 102. The emulsification ultrasonic waves will form wavefronts at the interface between the continuous phase 101 and the dispersion phase 102 and produce cavitation bubbles in the continuous phase 101. The emulsification ultrasonic oscillation source 107 is disposed outside the water tank 106, on a plane substantially parallel with the interface between the continuous phase 101 and the dispersion phase 102. The emulsification ultrasonic oscillation source 107 operates before the start of the oscillation operation of the separation ultrasonic oscillation source 108, and produces droplets of the dispersion phase 102 in the continuous phase 101. Material of the emulsification ultrasonic oscillation source 107 is desirably selected such that the difference in impedance between the water tank 106 and the emulsification ultrasonic oscillation source 107 is small in order to minimize the attenuation of the ultrasonic waves due to reflection at the interface between the water tank 106 and the emulsification ultrasonic oscillation source 107.

The separation ultrasonic oscillation source 108 oscillates ultrasonic waves for separation (hereinafter referred to as separation ultrasonic waves) to separate the continuous phase 101 and the dispersion phase 102 following the steps of emulsification and extraction of the solute 103. Such separation ultrasonic waves will aggregate the droplets, which have been produced by the emulsification, on the nodes and antinodes of the ultrasonic waves without producing cavitation bubbles in the continuous phase 101. The separation ultrasonic oscillation source 108 is disposed outside the water tank 106, on a plane substantially perpendicular to the interface between the continuous phase 101 and the dispersion phase 102. The separation ultrasonic oscillation source 108 operates after the termination of the operation of the emulsification ultrasonic oscillation source 107, and separates the continuous phase 101 and the dispersion phase 102. Material of the separation ultrasonic oscillation source 108 is desirably selected such that the difference in impedance between the water tank 106 and the separation ultrasonic oscillation source 108 is small in order to minimize the attenuation of the ultrasonic waves due to reflection at the interface between the water tank 106 and the separation ultrasonic oscillation source 108. The separation ultrasonic oscillation source 108 need not necessarily be disposed in a position substantially perpendicular to the emulsification ultrasonic oscillation source 107. For example, as shown in FIG. 2, the separation ultrasonic oscillation source 108 can be disposed on a plane substantially parallel with the interface between the continuous phase 101 and the dispersion phase 102 with a movement mechanism 111 for the emulsification ultrasonic oscillation source 107 and the separation ultrasonic oscillation source 108. In the system of FIG. 2, the water tank 106 is moved with the movement mechanism 111 in accordance with the ultrasonic irradiation timing so that the water tank 106 is irradiated with both emulsification ultrasonic waves and separation ultrasonic waves from the bottom side thereof, and thus, the emulsification ultrasonic oscillation source 107 and the separation ultrasonic oscillation source 108 are disposed below the water tank 106. The movement direction of the water tank 106 is substantially parallel with the interface between the continuous phase 101 and the dispersion phase 102. Alternatively, the water tank 106 can be moved by rotation by 180° using a turntable (not shown).

The ultrasonic-oscillation-source driving circuit 109 generates a voltage to drive the emulsification ultrasonic oscillation source 107 and the separation ultrasonic oscillation source 108.

The control unit 110 operates the ultrasonic-oscillation-source driving circuit 109.

Figure 3:
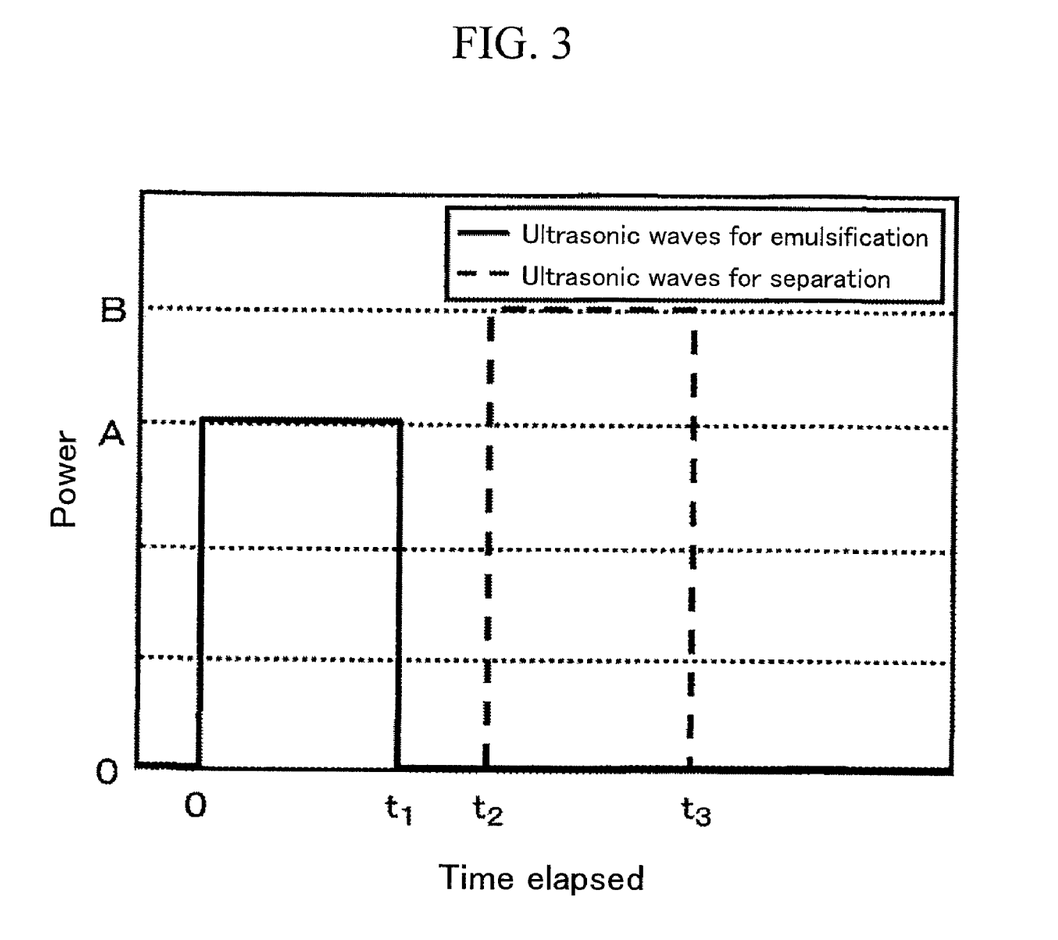
FIG. 3 is a diagram showing a time chart of the liquid-liquid extraction system in accordance with Embodiment 1.

FIG. 3 is a diagram showing a time chart of the drive of the emulsification ultrasonic oscillation source 107 and the separation ultrasonic oscillation source 108 in the liquid-liquid extraction of Embodiment 1. Hereinafter, the time chart of the drive of the emulsification ultrasonic oscillation source 107 and the separation ultrasonic oscillation source 108 will be detailed.

First, the emulsification ultrasonic oscillation source 107 is driven with irradiation power A from time 0, to t1 so that droplets of the dispersion phase 102 are produced in the continuous phase 101 with the emulsification ultrasonic waves and thus the two phases are emulsified. The irradiation power A is the power to emulsify the continuous phase 101 and the dispersion phase 102 with the frequency of the emulsification ultrasonic waves. The irradiation power A and the irradiation time t1 are determined by the kinds, liquid amounts, liquid amount ratio, and the like of the continuous phase 101 and the dispersion phase 102.

After the emulsification, the emulsion is allowed to stand still from time t1 to t2 so that the solute 103 dissolved in the continuous phase 101 or the dispersion phase 102 migrates to the other phase and is extracted. The extraction time (t2−t1) is determined by the kinds, liquid amounts, liquid amount ratio, and the like of the continuous phase 101 and the dispersion phase 102.

Then, the separation ultrasonic oscillation source 108 is driven with irradiation power B from time t2 to t3 so that the droplets are aggregated with the separation ultrasonic waves, and the two phases of the continuous phase 101 and the dispersion phase 102 are separated. The irradiation power B is the power to separate the continuous phase 101 and the dispersion phase 102 with the frequency of the separation ultrasonic waves. The irradiation power B and the separation time (t3−t2) are determined by the kinds, liquid amounts, liquid amount ratio, and the like of the continuous phase 101 and the dispersion phase 102.

That is, the separation ultrasonic oscillation source 108 operates after the termination of the operation of the emulsification ultrasonic oscillation source 107. The ultrasonic-oscillation-source driving circuit 109 sequentially drives the emulsification ultrasonic oscillation source 107 and the separation ultrasonic oscillation source 108. In order to control such drive, the control unit 110 that controls the ultrasonic-oscillation-source driving circuit 109 is also provided.

Figure 4:
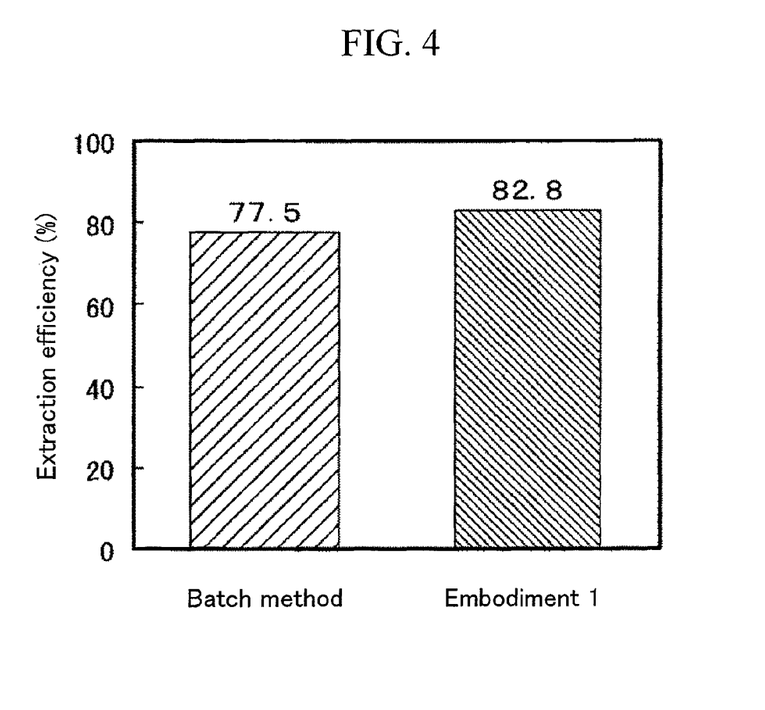
FIG. 4 is a diagram showing the extraction efficiency of the liquid-liquid extraction system in accordance with Embodiment 1.

FIG. 4 is a diagram showing the efficiency of liquid-liquid extraction of phthalate ester from water (a continuous phase) into hexane (a dispersion phase) in accordance with Embodiment 1. FIG. 4 shows the comparison result of the liquid-liquid extraction efficiency of the batch method and that of Embodiment 1, which were measured by calculating the ratio of the amount of injectant to the amount of extract. In Embodiment 1, irradiation with the emulsification ultrasonic waves was performed with the following conditions: a frequency of 0.16 MHz, a power of 400 W, and an irradiation time of 15 minutes, and irradiation with the separation ultrasonic waves was performed with the following conditions: a frequency of 1.6 MHz, a power of 400 W, and an irradiation time of 20 minutes.

Herein, the liquid amount of the continuous phase 101 was set to 100 ml, the liquid amount of the dispersion phase 102 was set to 2.5 ml, and 100 μg of the solute 103 was dissolved in the continuous phase 101.

The container 104 is made of glass, and the thickness d1 of the wall of the container 104 that is opposite the emulsification ultrasonic oscillation source 107 is designed to be 18 mm that is half the wavelength of the ultrasonic waves with a frequency of 0.16 MHz through the glass (a sound speed of 5,640 (m/s)). In addition, the thickness d2 of the wall of the container 104 that is opposite the separation ultrasonic oscillation source 108 is designed to be 1.8 mm that is half the wavelength of the ultrasonic waves with a frequency of 1.6 MHz through the glass (a sound speed of 5,640 (m/s)).

The water tank 106 is made of stainless steel, and the thickness d3 of the wall of the water tank 106 that is opposite the emulsification ultrasonic oscillation source 107 is designed to be 18 mm that is half the wavelength of the ultrasonic waves with a frequency of 0.16 MHz through the stainless steel (a sound speed of 5,790 (m/s)). In addition, the thickness d4 of the wall of the water tank 106 that is opposite the separation ultrasonic oscillation source 108 is designed to be 1.8 mm that is half the wavelength of the ultrasonic waves with a frequency of 1.6 MHz through the stainless steel (a sound speed of 5,790 (m/s)).

As shown in FIG. 4, the extraction efficiency of the batch method is 77.5%, whereas that of Embodiment 1 is 82.8%. Thus, FIG. 4 can confirm that the extraction efficiency of this embodiment has an equal level to or higher level than that of the batch method.

Embodiment 2 will be described with reference to FIGS. 5 and 6. In Embodiment 2, a continuous phase and a dispersion phase are emulsified using a microreactor with micro flow channels, and the dispersion phase is separated using ultrasonic waves.

Figure 5:
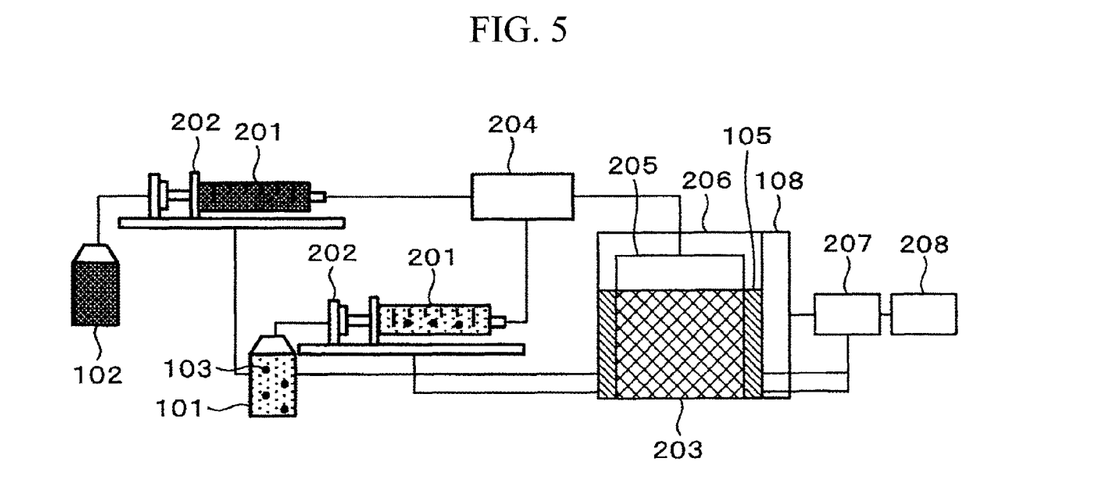
FIG. 5 is a diagram showing a liquid-liquid extraction system in accordance with Embodiment 2.

FIG. 5 is a diagram showing Embodiment 2. As shown in FIG. 5, the system of Embodiment 2 includes a continuous phase 101 and a dispersion phase 102 that are mutually immiscible liquids; a solute 103 dissolved in at least one of the continuous phase 101 and the dispersion phase 102; syringes 201 that transfer the continuous phase 101 and the dispersion phase 102; syringe pumps 202 that transfer liquids in the syringes 201; a microreactor 204 with micro flow channels therein that produces an emulsion 203 by emulsifying the continuous phase 101 and the dispersion phase 102; a container 205 containing the emulsion 203 and the solute 103; a water tank 206 accommodating therein the container 205 and containing water 105 around the container 205; a separation ultrasonic oscillation source 108 adapted to separate the continuous phase 101 and the dispersion phase 102 following the steps of emulsification and extraction of the solute 103; a driving circuit 207 that drives the separation ultrasonic oscillation source 108 and the syringe pumps 202; and a control unit 208 that operates the driving circuit 207.

Hereinafter, each element of Embodiment 2 shown in FIG. 5 will be detailed.

The continuous phase 101 and the dispersion phase 102 are mutually immiscible liquids. The solute 103 is dissolved in one of the continuous phase 101 and the dispersion phase 102, and will migrate to the other phase through liquid-liquid extraction.

The separation ultrasonic oscillation source 108, which oscillates separation ultrasonic waves to separate the continuous phase 101 and the dispersion phase 102 following the steps of emulsification and extraction of the solute 103, is disposed outside the water tank 206, on a plane substantially perpendicular to the interface between the continuous phase 101 and the dispersion phase 102. Such separation ultrasonic waves will aggregate the droplets, which have been produced by the emulsification, on the nodes and antinodes of the ultrasonic waves without producing cavitation bubbles in the continuous phase 101. The separation ultrasonic oscillation source 108 operates after the termination of the operation of the emulsification ultrasonic oscillation source 107, and separates the continuous phase 101 and the dispersion phase 102. Material of the separation ultrasonic oscillation source 108 is desirably selected such that the difference in impedance between the water tank 206 and the separation ultrasonic oscillation source 108 is small in order to minimize the attenuation of the ultrasonic waves due to reflection at the interface between the water tank 206 and the separation ultrasonic oscillation source 108.

The syringes 201 contain the continuous phase 101, the dispersion phase 102, and the solute 103, and transfer the liquids into the microreactor 204.

The syringe pumps 202 are driven to transfer the continuous phase 101 and the dispersion phase 102 in the syringes 201 into the microreactor 204.

The emulsion 203 is produced by emulsifying the continuous phase 101 and the dispersion phase 102 in the microreactor 204.

The microreactor 204 has flow channels therein, and produces the emulsion 203 by emulsifying the continuous phase 101 and the dispersion phase 102.

The thickness of the wall of the container 205 that is opposite the separation ultrasonic oscillation source 108 is designed to be an integral multiple of half the wavelength of ultrasonic waves that are oscillated by the separation ultrasonic oscillation source 108 in order to minimize the attenuation of the ultrasonic waves.

The thickness of the wall of the water tank 206 that is in contact with the separation ultrasonic oscillation source 108 is designed to be an integral multiple of half the wavelength of ultrasonic waves that are oscillated by the separation ultrasonic oscillation source 108 in order to minimize the attenuation of the ultrasonic waves due to resonance. Material of the water tank 206 is selected such that the difference in impedance between the water tank 206 and the separation ultrasonic oscillation source 108 is small in order to minimize the attenuation of the ultrasonic waves due to reflection at the interface between the water tank 206 and the separation ultrasonic oscillation source 108.

The driving circuit 207 drives the syringe pumps 202 and the separation ultrasonic oscillation source 108.

The control unit 208 operates the driving circuit 207.

Procedures of the liquid-liquid extraction in accordance with Embodiment 2 shown in FIG. 5 are described below.

First, the continuous phase 101, the dispersion phase 102, and the solute 103 that is dissolved in one of the continuous phase 101 and the dispersion phase 102 are stored in the syringes 201. Then, the continuous phase 101, the dispersion phase 102, and the solute 103 in the syringes 201 are transferred into the microreactor 204 for emulsification by driving the syringe pumps 202 with the driving circuit 207 and the control unit 208. In the microreactor 204, the continuous phase 101 and the dispersion phase 102 are emulsified to produce the emulsion 203. After the production of a desired amount of the emulsion 203 is confirmed, the syringe pumps 202 are stopped to terminate the emulsification. Next, the emulsion 203 is allowed to stand still for a given period of time so that the solute 103 will migrate to the other phase. Then, the separation ultrasonic oscillation source 108 is driven for a given period of time with the driving circuit 207 and the control unit 208 to separate the continuous phase 101 and the dispersion phase 102, whereby an aggregate of droplets of the dispersion phase 102 is formed in the continuous phase 101. After the formation of a desired amount of aggregate is confirmed, the drive of the separation ultrasonic oscillation source 108 is stopped to terminate the separation.

Figure 6:
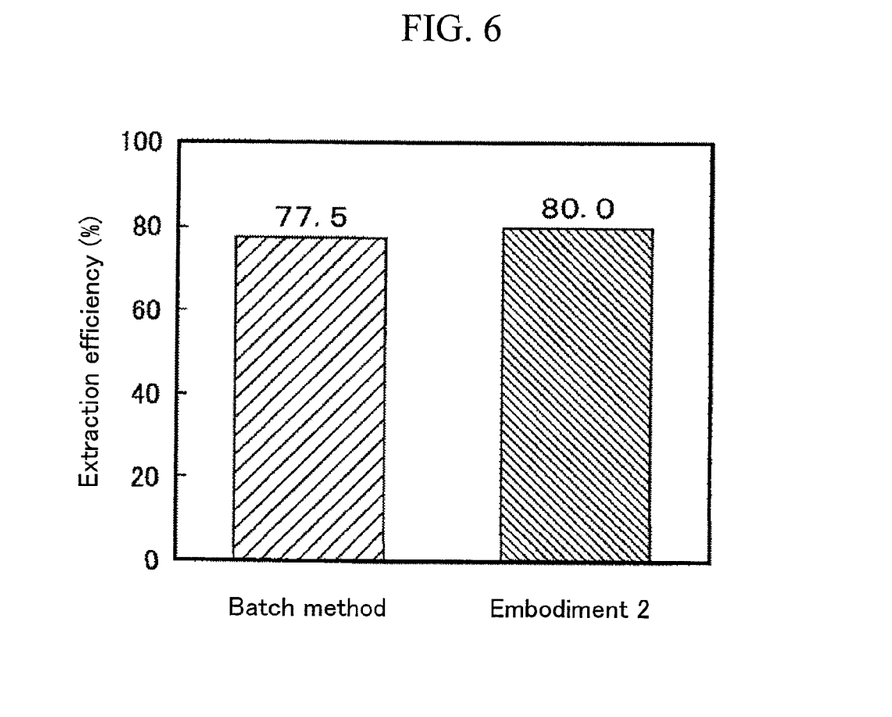
FIG. 6 is a diagram showing the extraction efficiency of the liquid-liquid extraction system in accordance with Embodiment 2.

FIG. 6 is a diagram showing the efficiency of liquid-liquid extraction of phthalate ester from water (a continuous phase) into hexane (a dispersion phase) in accordance with Embodiment 2. FIG. 6 shows the comparison result of the liquid-liquid extraction efficiency of the batch method and that of Embodiment 2, which were measured by calculating the ratio of the amount of injectant to the amount of extract. In Embodiment 2, irradiation with the emulsification ultrasonic waves was performed with the following conditions: a frequency of 0.16 MHz and a power of 400 W, and irradiation with the separation ultrasonic waves was performed with the following conditions: a frequency of 1.6 MHz and a power of 400 W.

Herein, the liquid amount of the continuous phase 101 was set to 100 ml, the liquid amount of the dispersion phase 102 was set to 2.5 ml, and 100 μg of the solute 103 was dissolved in the continuous phase 101.

The container 205 is made of glass, and the thickness d2 of the wall of the container 205 that is opposite the separation ultrasonic oscillation source 108 is designed to be 1.8 mm that is half the wavelength of the ultrasonic waves with a frequency of 1.6 MHz through the glass (a sound speed of 5,640 (m/s)).

The water tank 206 is made of stainless steel, and the thickness d4 of the wall of the water tank 206 that is opposite the separation ultrasonic oscillation source 108 is designed to be 1.8 mm that is half the wavelength of the ultrasonic waves with a frequency of 1.6 MHz through the stainless steel (a sound speed of 5,790 (m/s)).

As shown in FIG. 6, the extraction efficiency of the batch method is 77.5%, whereas that of the system of Embodiment 2 is 80.0%. Thus, FIG. 6 can confirm that the extraction efficiency of the system of this embodiment has an equal level to or higher level than that of the batch method.

Embodiment 3 will be described with reference to FIGS. 7 and 8. In Embodiment 3, a continuous phase and a dispersion phase are emulsified with an emulsification technique using a microreactor with flow channels and also using ultrasonic waves, and the dispersion phase is separated with a separation technique using ultrasonic waves.

Figure 7:
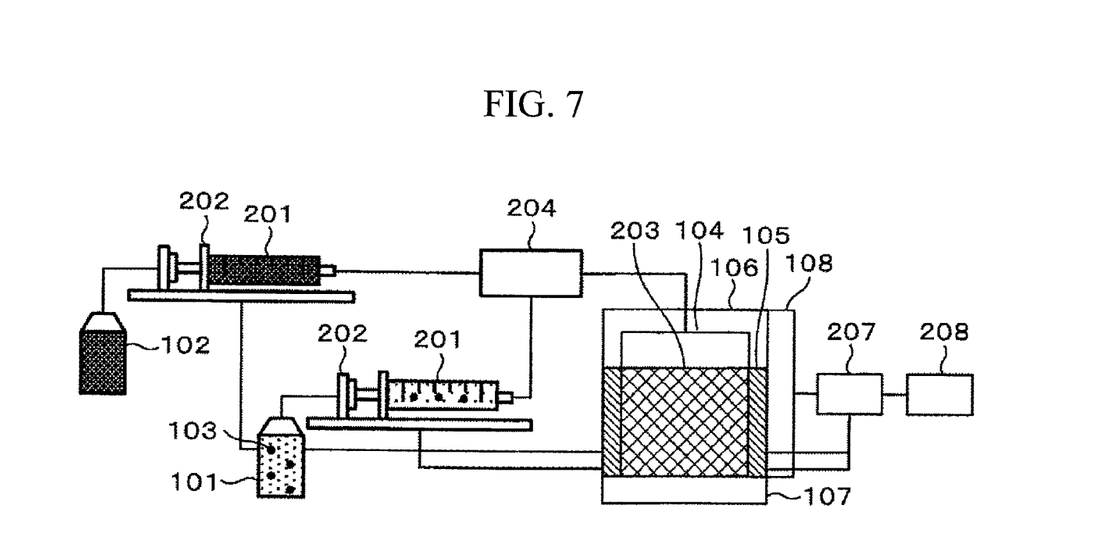
FIG. 7 is a diagram showing a liquid-liquid extraction system in accordance with Embodiment 3.

FIG. 7 is a diagram showing Embodiment 3. As shown in FIG. 7, the system of Embodiment 3 includes a continuous phase 101 and a dispersion phase 102 that are mutually immiscible liquids; a solute 103 dissolved in at least one of the continuous phase 101 and the dispersion phase 102; syringes 201 that transfer the continuous phase 101 and the dispersion phase 102; syringe pumps 202 that transfer liquids in the syringes 201; a microreactor 204 with flow channels therein that produces an emulsion 203 by emulsifying the continuous phase 101 and the dispersion phase 102; a container 104 containing the emulsion 203 and the solute 103; a water tank 106 accommodating therein the container 104 and containing water 105 around the container 104; an emulsification ultrasonic oscillation source 107 adapted to further reduce the size of droplets in the emulsion 203 produced in the microreactor 204; a separation ultrasonic oscillation source 108 adapted to separate the continuous phase 101 and the dispersion phase 102 following the steps of emulsification and extraction of the solute 103; a driving circuit 207 that drives the emulsification ultrasonic oscillation source 107, the separation ultrasonic oscillation source 108, and the syringe pumps 202; and a control unit 208 that operates the driving circuit 207.

Hereinafter, each element of Embodiment 3 shown in FIG. 7 will be detailed.

The continuous phase 101 and the dispersion phase 102 are mutually immiscible liquids. The solute 103 is dissolved in one of the continuous phase 101 and the dispersion phase 102, and will migrate to the other phase through liquid-liquid extraction.

The container 104 is disposed such that its wall is substantially parallel with or substantially perpendicular to the interface between the continuous phase 101 and the dispersion phase 102. The thickness of the wall of the container 104 is designed to be at least an integral multiple of half the wavelength of ultrasonic waves that are oscillated by the emulsification ultrasonic oscillation source 107 or the separation ultrasonic oscillation source 108 in order to minimize the attenuation of the ultrasonic waves.

The thickness of the wall of the water tank 106 is designed to be at least an integral multiple of half the wavelength of ultrasonic waves that are oscillated by the emulsification ultrasonic oscillation source 107 or the separation ultrasonic oscillation source 108 in order to minimize the attenuation of the ultrasonic waves due to resonance. Material of the water tank 106 is selected such that the difference in impedance between the water tank 106 and the emulsification ultrasonic oscillation source 107 and between the water tank 106 and the separation ultrasonic oscillation source 108 is small in order to minimize the attenuation of the ultrasonic waves due to reflection at the interface between the water tank 106 and the emulsification ultrasonic oscillation source 107 or the separation ultrasonic oscillation source 108.

The emulsification ultrasonic oscillation source 107 oscillates emulsification ultrasonic waves to emulsify the continuous phase 101 and the dispersion phase 102. The emulsification ultrasonic waves will form wavefronts at the interface between the continuous phase 101 and the dispersion phase 102 and produce cavitation bubbles in the continuous phase 101. The emulsification ultrasonic oscillation source 107 is disposed outside the water tank 106, on a plane substantially parallel with the interface between the continuous phase 101 and the dispersion phase 102. The emulsification ultrasonic oscillation source 107 operates before the start of the oscillation operation of the separation ultrasonic oscillation source 108, and produces droplets of the dispersion phase 102 in the continuous phase 101. Material of the emulsification ultrasonic oscillation source 107 is desirably selected such that the difference in impedance between the water tank 106 and the emulsification ultrasonic oscillation source 107 is small in order to minimize the attenuation of the ultrasonic waves due to reflection at the interface between the water tank 106 and the emulsification ultrasonic oscillation source 107.

The separation ultrasonic oscillation source 108 oscillates separation ultrasonic waves to separate the continuous phase 101 and the dispersion phase 102 following the steps of emulsification and extraction of the solute 103. The separation ultrasonic waves will aggregate the droplets, which have been produced by the emulsification, on the nodes and antinodes of the ultrasonic waves without producing cavitation bubbles in the continuous phase 101. The separation ultrasonic oscillation source 108 is disposed outside the water tank 106, on a plane substantially perpendicular to the interface between the continuous phase 101 and the dispersion phase 102. The separation ultrasonic oscillation source 108 operates after the termination of the operation of the emulsification ultrasonic oscillation source 107, and separates the continuous phase 101 and the dispersion phase 102. Material of the separation ultrasonic oscillation source 108 is desirably selected such that the difference in impedance between the water tank 106 and the separation ultrasonic oscillation source 108 is small in order to minimize the attenuation of the ultrasonic waves due to reflection at the interface between the water tank 106 and the separation ultrasonic oscillation source 108. The separation ultrasonic oscillation source 108 need not necessarily be disposed in a position substantially perpendicular to the emulsification ultrasonic oscillation source 107 as shown in FIG. 1. For example, as shown in FIG. 2, the separation ultrasonic oscillation source 108 can be disposed on a plane substantially parallel with the interface between the continuous phase 101 and the dispersion phase 102 with the movement mechanism 111 for the emulsification ultrasonic oscillation source 107 and the separation ultrasonic oscillation source 108.

The syringes 201 contain the continuous phase 101, the dispersion phase 102, and the solute 103, and transfer the continuous phase 101 and the dispersion phase 102 into the microreactor 204.

The syringe pumps 202 are driven to transfer the continuous phase 101 and the dispersion phase 102 in the syringes 201 into the microreactor 204.

The emulsion 203 is produced by emulsifying the continuous phase 101 and the dispersion phase 102 in the microreactor 204.

The microreactor 204 has flow channels therein, and produces the emulsion 203 by emulsifying the continuous phase 101 and the dispersion phase 102.

The driving circuit 207 drives the syringe pumps 202, the emulsification ultrasonic oscillation source 107, and the separation ultrasonic oscillation source 108.

The control unit 208 operates the driving circuit 207.

Procedures of the liquid-liquid extraction in accordance with Embodiment 3 shown in FIG. 7 are described below.

First, the continuous phase 101, the dispersion phase 102, and the solute 103 that is dissolved in one of the continuous phase 101 and the dispersion phase 102 are stored in the syringes 201. Then, the continuous phase 101, the dispersion phase 102, and the solute 103 in the syringes 201 are transferred into the microreactor 204 for emulsification by driving the syringe pumps 202 with the driving circuit 207 and the control unit 208. In the microreactor 204, the continuous phase 101 and the dispersion phase 102 are emulsified to produce the emulsion 203. After the production of a desired amount of the emulsion 203 is confirmed, the syringe pumps 202 are stopped. Then, the emulsification ultrasonic oscillation source 107 is driven with the driving circuit 207 and the control unit 208 to reduce the size of droplets in the emulsion 203. After the reduction in the size of the droplets down to a desired diameter is confirmed, the emulsification ultrasonic oscillation source 107 is stopped to terminate the emulsification. Next, the emulsion 203 is allowed to stand still for a given period of time so that the solute 103 will migrate to the other phase. Then, the separation ultrasonic oscillation source 108 is driven for a given period of time with the driving circuit 207 and the control unit 208 to separate the continuous phase 101 and the dispersion phase 102, whereby an aggregate of droplets of the dispersion phase 102 is formed in the continuous phase 101. After the formation of a desired amount of aggregate is confirmed, the drive of the separation ultrasonic oscillation source 108 is stopped to terminate the separation.

Figure 8:
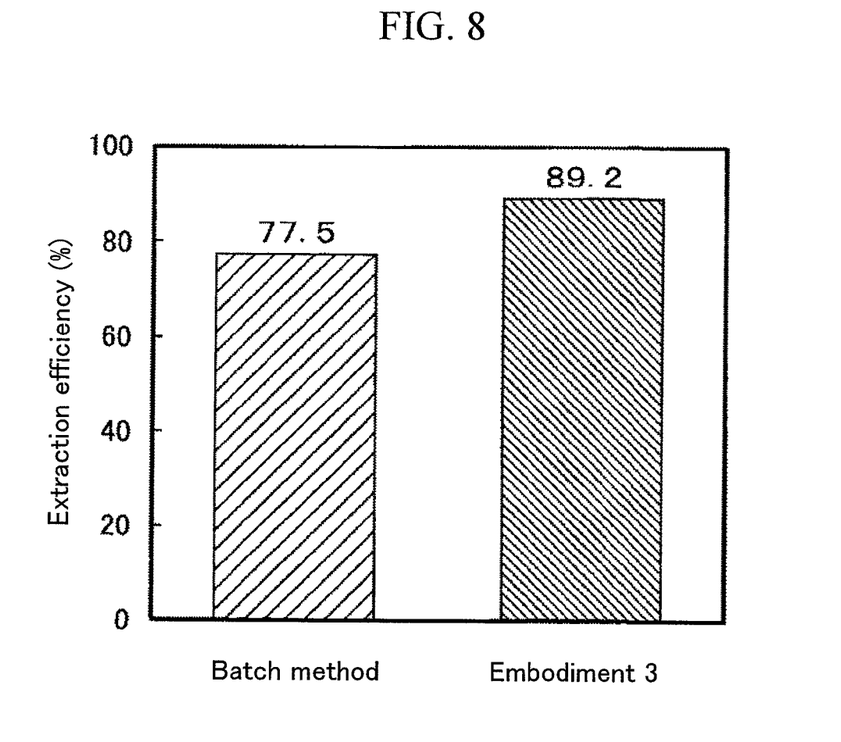
FIG. 8 is a diagram showing the extraction efficiency of the liquid-liquid extraction system in accordance with Embodiment 3.

FIG. 8 is a diagram showing the efficiency of liquid-liquid extraction of phthalate ester from water (a continuous phase) into hexane (a dispersion phase) in accordance with Embodiment 3. FIG. 8 shows the comparison result of the liquid-liquid extraction efficiency of the batch method and that of Embodiment 3, which were measured by calculating the ratio of the amount of injectant to the amount of extract. In Embodiment 3, irradiation with the emulsification ultrasonic waves was performed with the following conditions: a frequency of 0.16 MHz and a power of 400 W, and irradiation with the separation ultrasonic waves was performed with the following conditions: a frequency of 1.6 MHz and a power of 400 W.

Herein, the liquid amount of the continuous phase 101 was set to 100 ml, the liquid amount of the dispersion phase 102 was set to 2.5 ml, and 100 μg of the solute 103 was dissolved in the continuous phase 101.

The container 104 is made of glass, and the thickness d1 of the wall of the container 104 that is opposite the emulsification ultrasonic oscillation source 107 is designed to be 18 mm that is half the wavelength of the ultrasonic waves with a frequency of 0.16 MHz through the glass (a sound speed of 5,640 (m/s)). In addition, the thickness d2 of the wall of the container 104 that is opposite the separation ultrasonic oscillation source 108 is designed to be 1.8 mm that is half the wavelength of the ultrasonic waves with a frequency of 1.6 MHz through the glass (a sound speed of 5,640 (m/s)).

The water tank 106 is made of stainless steel, and the thickness d3 of the wall of the water tank 106 that is opposite the emulsification ultrasonic oscillation source 107 is designed to be 18 mm that is half the wavelength of the ultrasonic waves with a frequency of 0.16 MHz through the stainless steel (a sound speed of 5,790 (m/s)). In addition, the thickness d4 of the wall of the water tank 106 that is opposite the separation ultrasonic oscillation source 108 is designed to be 1.8 mm that is half the wavelength of the ultrasonic waves with a frequency of 1.6 MHz through the stainless steel (a sound speed of 5,790 (m/s)).

As shown in FIG. 8, the extraction efficiency of the batch method is 77.5%, whereas that of Embodiment 3 is 89.2%. Thus, FIG. 8 can confirm that the extraction efficiency of this embodiment has an equal level to or higher level than that of the batch method.

Embodiment 4 will be described with reference to FIGS. 9 and 10.

In Embodiment 4, one of the liquid-liquid extraction systems in accordance with Embodiments 1 to 3 is used for detection of medicament in the whole blood. According to Embodiment 4, detection of medicament in the whole blood, which is currently performed manually with individual systems, can be performed automatically with a single system.

Figure 9:
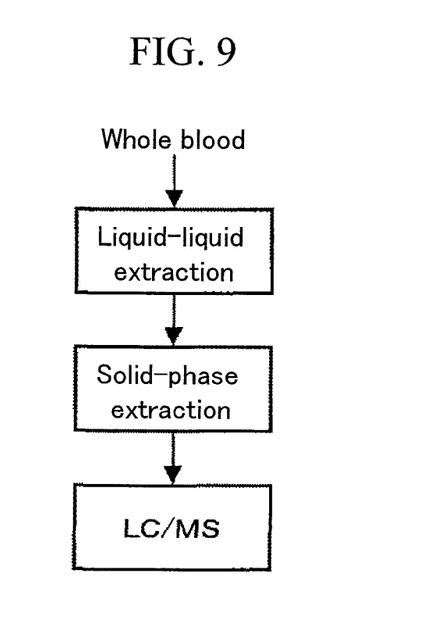
FIG. 9 is a flow chart showing the currently used detection scheme of medicament in the whole blood in accordance with Embodiment 4.

FIG. 9 is a flow chart showing the currently used detection scheme of medicament in the whole blood. As shown in FIG. 9, detection of medicament in the whole blood involves a total of three steps: removing substances other than medicament, such as protein, by liquid-liquid extraction and solid-phase extraction, and LC/MC (Liquid Chromatography/Mass Spectrometer). Currently, all of the three steps are performed manually with individual systems.

Figure 10:
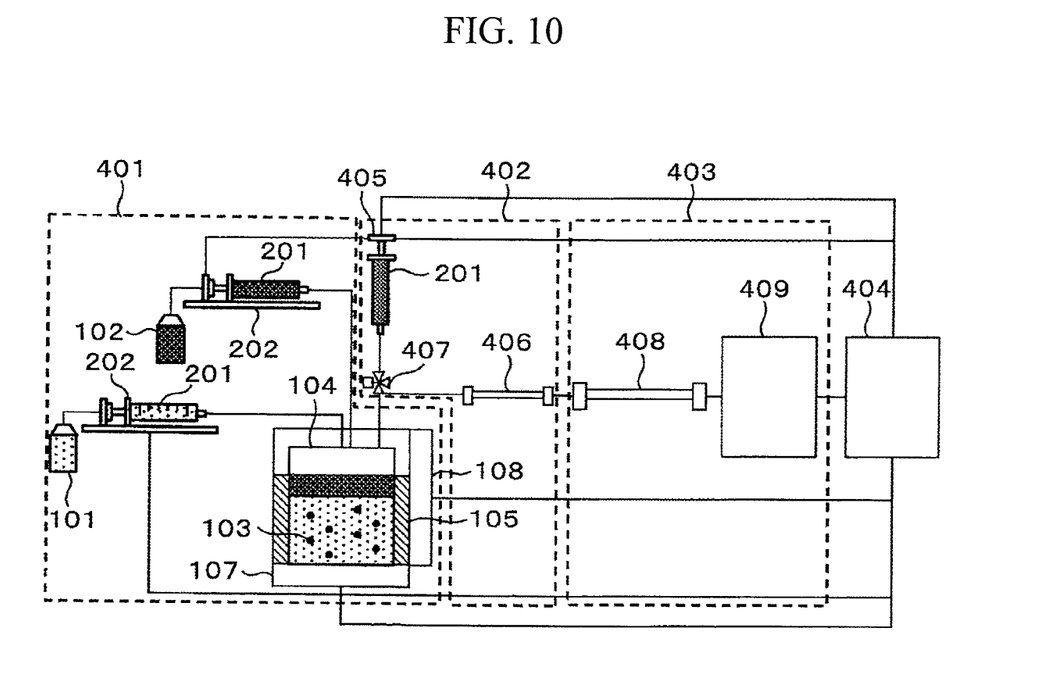
FIG. 10 is a diagram showing a system for detecting medicament in the whole blood in accordance with Embodiment 4.

FIG. 10 is a diagram showing Embodiment 4. In Embodiment 4, the steps of detecting medicament in the whole blood shown in FIG. 9, which are performed manually with individual systems, are automated and performed with a single system. As shown in FIG. 10, the system of Embodiment 4 includes a liquid-liquid extraction unit 401, a solid-phase extraction unit 402, an LC/MS unit 403, and a control unit 404. Although the liquid-liquid extraction system of Embodiment 1 is used as the liquid-liquid extraction unit 401 in FIG. 10, the liquid-liquid extraction system of Embodiment 2 or 3 can also be used.

Hereinafter, each element of the liquid-liquid extraction unit 401, the solid-phase extraction unit 402, and the LC/MS unit 403 shown in FIG. 10 will be detailed.

The liquid-liquid extraction unit 401 includes a continuous phase 101, a dispersion phase 102, a solute 103, syringes 201, syringe pumps 202, a container 104, a water tank 106, an emulsification ultrasonic oscillation source 107, and a separation ultrasonic oscillation source 108.

The solid-phase extraction unit 402 includes a recovery syringe 405 that recovers a partially purified sample in the container 104 that has been produced in the liquid-liquid extraction unit 401, a solid-phase extraction column 406 that removes substances other than medicament, such as protein, from the partially purified sample obtained after the liquid-liquid extraction, and a three-way valve 407 that controls the direction in which liquid flows between the container 104, the recovery syringe 405, and the solid-phase extraction column 406.

The LC/MS unit 403 includes a liquid chromatography column 408 that removes substances other than medicament, such as protein, from the purified sample obtained after the solid-phase extraction, and a detection unit 409 that detects medicament.

The control unit 404 drives the emulsification ultrasonic oscillation source 107, the separation ultrasonic oscillation source 108, and the syringe pumps 202, and processes data of the detection unit 409.

Procedures to detect medicament in the whole blood in accordance with Embodiment 4 shown in FIG. 10 are described below.

First, liquid-liquid extraction is performed with the liquid-liquid extraction unit 401 in the same procedures as those of any of Embodiments 1 to 3, so that a partially purified sample with substances other than medicament, such as protein, removed is obtained.

Second, the three-way valve 407 is opened between the container 104 and the recovery syringe 405, so that the partially purified sample in the container 104 is recovered into the recovery syringe 405 using the syringe pump 202. After the recovery, the three-way valve 407 is opened between the recovery syringe 405 and the solid-phase extraction column 406, and solid-phase extraction is performed by transferring the partially purified sample to the solid-phase extraction column 406 using the syringe pump 202, so that a purified sample with substances other than medicament, such as protein, thoroughly removed is obtained.

Third, the purified sample obtained after the solid-phase extraction is transferred to the liquid chromatography column 408 to perform liquid chromatography, so that a detection sample for use in detection is obtained.

The medicament in the detection sample is detected with the detection unit 409, and the detected data is processed with the control unit 404.

As in Embodiment 1, the container 104 is disposed such that its wall is substantially parallel with or substantially perpendicular to the interface between the continuous phase 101 and the dispersion phase 102. The thickness of the wall of the container 104 is designed to be at least an integral multiple of half the wavelength of ultrasonic waves that are oscillated by the emulsification ultrasonic oscillation source 107 or the separation ultrasonic oscillation source 108 in order to minimize the attenuation of the ultrasonic waves. Further, the thickness of the wall of the water tank 106 is designed to be at least an integral multiple of half the wavelength of ultrasonic waves that are oscillated by the emulsification ultrasonic oscillation source 107 or the separation ultrasonic oscillation source 108 in order to minimize the attenuation of the ultrasonic waves due to resonance. Material of the water tank 106 is selected such that the difference in impedance between the water tank 106 and the emulsification ultrasonic oscillation source 107 and between the water tank 106 and the separation ultrasonic oscillation source 108 is small in order to minimize the attenuation of the ultrasonic waves due to reflection at the interface between the water tank 106 and the emulsification ultrasonic oscillation source 107 or the separation ultrasonic oscillation source 108.

Embodiment 5 will be described with reference to FIG. 11.

Embodiment 5 relates to a hybrid system in which a microreactor and a liquid-liquid extraction system are combined.

In Embodiment 5, after an emulsion is produced with a microreactor, the emulsion is irradiated with emulsification ultrasonic waves so that the size of droplets in the emulsion is further reduced. Thus, the extraction efficiency increases than when the microreactor is used alone. Further, as the separation of the droplets is promoted by the ultrasonic irradiation, the processing time can be reduced.

Figure 11:
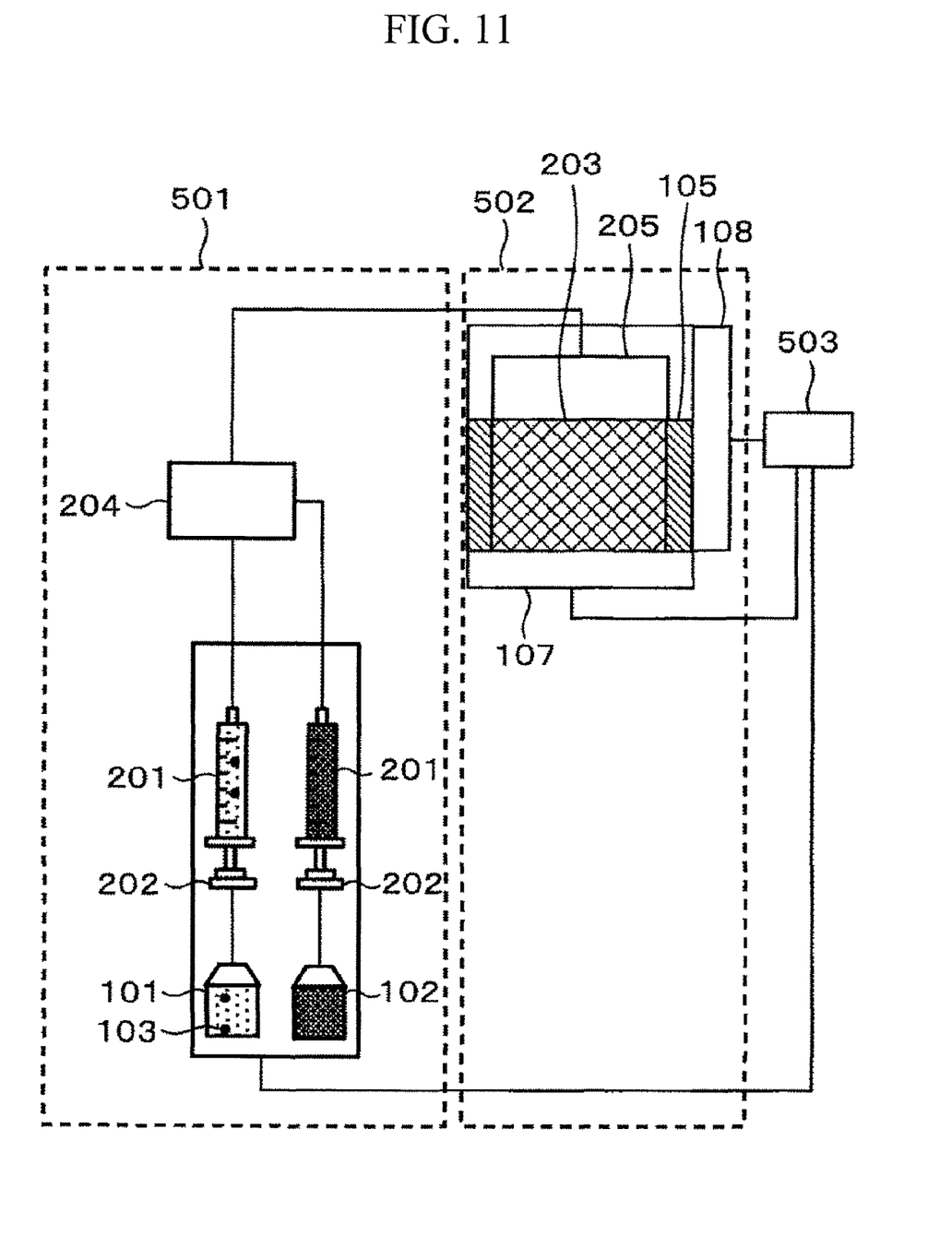
FIG. 11 is a diagram showing a hybrid system in accordance with Embodiment 5 in which a microreactor and a liquid-liquid extraction system are combined.

FIG. 11 is a diagram showing Embodiment 5. As shown in FIG. 11, the system of Embodiment 5 includes a microreactor unit 501, a liquid-liquid extraction unit 502, and a control unit 503.

Hereinafter, each element of the microreactor unit 501 and the liquid-liquid extraction unit 502 shown in FIG. 11 will be detailed.

The microreactor unit 501 includes a continuous phase 101, a dispersion phase 102, a solute 103, syringes 201, syringe pumps 202, a microreactor 204, and a temperature control unit that controls the temperature in the microreactor 204.

The liquid-liquid extraction unit 502 includes an emulsion 203, a container 205, a water tank 106, an emulsification ultrasonic oscillation source 107, and a separation ultrasonic oscillation source 108. In FIG. 11, the emulsification ultrasonic oscillation source 107 and the separation ultrasonic oscillation source 108 are disposed on the water tank 106. However, it is also possible to dispose only the separation ultrasonic oscillation source 108 without disposing the emulsification ultrasonic oscillation source 107.

The control unit 503 drives the emulsification ultrasonic oscillation source 107, the separation ultrasonic oscillation source 108, and the syringe pumps 202, and also controls such drive.

Procedures of the liquid-liquid extraction in accordance with Embodiment 5 shown in FIG. 11 are described below.

First, the continuous phase 101, the dispersion phase 102, and the solute 103 that is dissolved in one of the continuous phase 101 and the dispersion phase 102 are stored in the syringes 201. Then, the liquids in the syringes 201 are transferred into the microreactor 204 by driving the syringe pumps 202 with the control unit 503, so that the emulsion 203 is produced in the microreactor 204 by emulsifying the continuous phase 101 and the dispersion phase 102. After the production of a desired amount of the emulsion 203 is confirmed, the syringe pumps 202 are stopped to terminate the emulsification.

Second, the emulsification ultrasonic oscillation source 107 is driven with the control unit 503 to reduce the size of the droplets in the emulsion 203. That is, the control unit 503 causes the emulsification ultrasonic oscillation source 107 to operate after the termination of the emulsification. The emulsification ultrasonic oscillation source 107 need not necessarily be driven. For example, the emulsification ultrasonic oscillation source 107 need not be driven if the production of droplets with a desired diameter is confirmed with the use of the microreactor 204 alone. After the production of droplets with a desired diameter is confirmed, the emulsification ultrasonic oscillation source 107 is stopped to terminate the emulsification. Then, the emulsion is allowed to stand still for a given period of time so that the solute 103 will migrate to the other phase. After that, the separation ultrasonic oscillation source 108 is driven for a given period of time with the control unit 503 to separate the continuous phase 101 and the dispersion phase 102, whereby an aggregate of droplets of the dispersion phase 102 is formed in the continuous phase 101. After the formation of a desired amount of aggregate is confirmed, the drive of the separation ultrasonic oscillation source 108 is stopped to terminate the separation.

That is, Embodiment 5 relates to a liquid-liquid extraction system with which liquid-liquid extraction is performed by causing the solute 103, which is dissolved in one of the continuous phase 101 and the dispersion phase 102 that are mutually immiscible liquids, to migrate to the other phase. Specifically, the system includes a microreactor 204 with micro flow channels therein that produces the solute 103 of the dispersion phase 102 in the continuous phase 101 to emulsify the two phases, a container 205 adapted to contain the continuous phase 101, the dispersion phase 102, and the solute 103 transferred from the microreactor 204, a water tank 106 accommodating therein the container 205 and containing water 105 around the container 205, a separation ultrasonic oscillation source 108 disposed outside the water tank 106, and a control unit 503 that operates the separation ultrasonic oscillation source 108 after the termination of emulsification. The control unit 503 sequentially drives the emulsification ultrasonic oscillation source 107 and the separation ultrasonic oscillation source 108.

As in Embodiment 1, the container 104 is disposed such that its wall is substantially parallel with or substantially perpendicular to the interface between the continuous phase 101 and the dispersion phase 102. The thickness of the wall of the container 104 is designed to be at least an integral multiple of half the wavelength of ultrasonic waves that are oscillated by the emulsification ultrasonic oscillation source 107 or the separation ultrasonic oscillation source 108 in order to minimize the attenuation of the ultrasonic waves. The thickness of the wall of the water tank 106 is designed to be at least an integral multiple of half the wavelength of ultrasonic waves that are oscillated by the emulsification ultrasonic oscillation source 107 or the separation ultrasonic oscillation source 108 in order to minimize the attenuation of the ultrasonic waves due to resonance. Material of the water tank 106 is selected such that the difference in impedance between the water tank 106 and the emulsification ultrasonic oscillation source 107 and between the water tank 106 and the separation ultrasonic oscillation source 108 is small in order to minimize the attenuation of the ultrasonic waves due to reflection at the interface between the water tank 106 and the emulsification ultrasonic oscillation source 107 or the separation ultrasonic oscillation source 108.

According to the aforementioned embodiments, the liquid-liquid extraction time can be reduced and variations in the amount of extraction of a solute can be reduced, whereby the extraction efficiency can be improved. Further, liquid-liquid extraction by emulsification and separation with ultrasonic irradiation can be continuously performed in a short time, and the size of the liquid-liquid extraction system can be reduced. In addition, two ultrasonic oscillation sources for emulsification and separation can be disposed on a single water tank without degrading the performance of both the emulsification and separation.

What is claimed is:

1. A liquid-liquid extraction system comprising:
   a container adapted to contain a continuous phase and a dispersion phase that are mutually immiscible liquids, and a solute dissolved in at least one of the continuous phase and the dispersion phase;
   a water tank accommodating therein the container and containing water around the container;
   an emulsification ultrasonic oscillation source disposed outside the water tank, on a plane substantially parallel with an interface between the continuous phase and the dispersion phase;
   a separation ultrasonic oscillation source disposed outside the water tank;
   an ultrasonic-oscillation-source driving circuit configured to drive the emulsification ultrasonic oscillation source and the separation ultrasonic oscillation source; and
   a control unit configured to control the ultrasonic-oscillation-source driving circuit such that the ultrasonic-oscillation-source driving circuit sequentially drives the emulsification ultrasonic oscillation source and the separation ultrasonic oscillation source.

2. The liquid-liquid extraction system according to claim 1, wherein the separation ultrasonic oscillation source is disposed on a plane substantially perpendicular to the interface between the continuous phase and the dispersion phase.

3. The liquid-liquid extraction system according to claim 1, further comprising a movement mechanism configured to move the water tank in a direction substantially parallel with the interface between the continuous phase and the dispersion phase, wherein the separation ultrasonic oscillation source is disposed on the plane substantially parallel with the interface between the continuous phase and the dispersion phase.

4. The liquid-liquid extraction system according to claim 1, wherein
   a wall of the container is disposed substantially parallel with or substantially perpendicular to the emulsification ultrasonic oscillation source, and
   a thickness of the wall of the container is an integral multiple of half a wavelength of ultrasonic waves that are oscillated by the emulsification ultrasonic oscillation source or the separation ultrasonic oscillation source.

5. The liquid-liquid extraction system according to claim 1, wherein a thickness of the wall of the water tank is an integral multiple of half a wavelength of ultrasonic waves that are oscillated by the emulsification ultrasonic oscillation source or the separation ultrasonic oscillation source.

6. A liquid-liquid extraction system with which liquid-liquid extraction is performed by causing a solute dissolved in one of a continuous phase and a dispersion phase that are mutually immiscible liquids to migrate to the other phase, the system comprising:
- a microreactor with micro flow channels therein, the microreactor being adapted to produce droplets of the dispersion phase in the continuous phase to emulsify the two phases;
- a container adapted to contain the continuous phase, the dispersion phase, and the solute transferred from the microreactor;
- a water tank accommodating therein the container and containing water around the container;
- a separation ultrasonic oscillation source disposed outside the water tank; and
- a control unit configured to cause the separation ultrasonic oscillation source to operate after the emulsification.

7. The liquid-liquid extraction system according to claim 6, further comprising an emulsification ultrasonic oscillation source disposed outside the water tank, on a plane substantially parallel with an interface between the continuous phase and the dispersion phase, wherein the control unit sequentially drives the emulsification ultrasonic oscillation source and the separation ultrasonic oscillation source.

* * * * *